(12) United States Patent
Werni et al.

(10) Patent No.: US 8,220,253 B2
(45) Date of Patent: Jul. 17, 2012

(54) EXHAUST GAS AFTERTREATMENT DEVICE FOR AN INTERNAL COMBUSTION ENGINE

(75) Inventors: Marcus Werni, Waiblingen (DE); Siegfried Woerner, Esslingen (DE); Rudolf Buhmann, Esslingen (DE); Rainer Lehnen, Ebersbach (DE)

(73) Assignee: J. Eberspaecher GmbH & Co., KG, Esslingen (DE)

( * ) Notice: Subject to any disclaimer, the term of this patent is extended or adjusted under 35 U.S.C. 154(b) by 844 days.

(21) Appl. No.: 11/804,716

(22) Filed: May 18, 2007

(65) Prior Publication Data
US 2007/0289294 A1 Dec. 20, 2007

(30) Foreign Application Priority Data

May 19, 2006 (DE) .......................... 10 2006 023 854

(51) Int. Cl.
*F01N 3/00* (2006.01)
*F01N 3/10* (2006.01)
*F01N 13/08* (2010.01)
*F01N 1/24* (2006.01)
*F01N 1/08* (2006.01)

(52) U.S. Cl. ............ 60/301; 60/295; 181/227; 181/228; 181/257; 181/268

(58) Field of Classification Search .................. 60/295, 60/296, 303, 301; 181/222, 227–228, 256–257, 181/268, 270
See application file for complete search history.

(56) References Cited

U.S. PATENT DOCUMENTS

| | | | |
|---|---|---|---|
| 3,235,003 A * | 2/1966 | Smith ............................ 165/135 |
| 3,736,105 A * | 5/1973 | Tourtellotte et al. ........... 422/171 |
| 4,579,194 A * | 4/1986 | Shiki et al. ..................... 181/231 |
| 4,595,073 A * | 6/1986 | Thawani ......................... 181/265 |
| 6,183,689 B1 * | 2/2001 | Roy et al. ......................... 419/38 |
| 6,312,650 B1 * | 11/2001 | Frederiksen et al. ......... 422/180 |
| 6,442,933 B2 * | 9/2002 | Rusch .............................. 60/286 |
| 2002/0106312 A1 | 8/2002 | Harris |
| 2003/0108457 A1 * | 6/2003 | Gault et al. ..................... 422/177 |
| 2004/0040782 A1 * | 3/2004 | Frederiksen ................... 181/258 |
| 2005/0103000 A1 * | 5/2005 | Nieuwstadt et al. ............. 60/286 |

(Continued)

FOREIGN PATENT DOCUMENTS

EP 0579956 A1 1/1994

(Continued)

OTHER PUBLICATIONS

NGK Spark Plug Co Ltd, English Abstract of JP 59-073478 A, Apr. 25, 1984.*

(Continued)

*Primary Examiner* — Thomas Denion
*Assistant Examiner* — Audrey K Bradley
(74) *Attorney, Agent, or Firm* — Howard IP Law Group, P.C.

(57) ABSTRACT

The invention relates to an exhaust gas after-treatment device for an internal combustion engine, including a housing into which an exhaust pipe that opens into a mixing chamber penetrates. The mixing chamber is shaped as a pot and reverses a direction of flow of the incoming exhaust gas whereby it returns the exhaust gas radially outside of the exhaust pipe. An open end of the pot-shaped mixing chamber opens into a collecting space which is designed so that it supplies the exhaust gas to at least one downstream SCR catalytic converter.

20 Claims, 5 Drawing Sheets

U.S. PATENT DOCUMENTS

2006/0000667 A1* 1/2006 Osterkamp et al. ........... 181/249
2006/0191415 A1* 8/2006 Johnson ........................ 96/108

FOREIGN PATENT DOCUMENTS

| EP | 1050670 A2 | | 11/2000 |
|---|---|---|---|
| EP | 1510674 A1 | | 3/2005 |
| JP | 52-046219 | | 4/1977 |
| JP | 59073478 A | * | 4/1984 |
| JP | 01-228525 | | 9/1989 |
| JP | 2001-234735 | | 8/2001 |
| JP | 2002-213233 | | 7/2002 |
| JP | 2003293739 A | * | 10/2003 |
| WO | 01/42630 A2 | | 6/2001 |
| WO | 2005/001252 A1 | | 1/2005 |

OTHER PUBLICATIONS

Hiranuma et al, Machine Translation of JP 2003-293739 A, Oct. 15, 2003.*
"Hollow" definition, retrieved Sep. 7, from Dictionary.com.*
"Directly" definition, retrieved Sep. 7, from Dictionary.com.*
"Unobstructed" definition, retrieved Sep. 7, from Dictionary.com.*
"Adjacent" definition, retrieved Sep. 7, from Dictionary.com.*

* cited by examiner

EXHAUST GAS AFTERTREATMENT DEVICE FOR AN INTERNAL COMBUSTION ENGINE

FIELD OF THE INVENTION

The present invention relates to an exhaust gas after-treatment device for an internal combustion engine.

BACKGROUND OF THE INVENTION

A selective catalytic reduction method (SCR method) refers to a selective chemical reaction in which only the nitrogen oxides are reduced instead of all the exhaust gas components of the exhaust. In automotive engineering, this method is increasingly being used in trucks and commercial vehicles having diesel engines to make it possible to reduce pollutant emissions to the extent that they comply with the EU4 standard. The ammonia required for the reduction is not added directly, i.e., in pure form, but instead is added in the form of an aqueous urea solution which is injected into the exhaust line where it triggers cleavage of the urea-water solution into ammonia and water by means of a hydrolysis reaction. The advantage of the SCR method is the removal of soot particles and nitrogen oxides from the exhaust and therefore definitely reduced emissions. The disadvantage of the previous method is in particular the fact that mixing of urea with the exhaust to be cleaned cannot be adequately accomplished.

SUMMARY OF THE INVENTION

The present invention relates to the problem of providing an embodiment for an exhaust gas after-treatment device characterized in particular by improved mixing of a reducing agent with the exhaust gas to be cleaned.

The invention is based on the general idea of repeatedly deflecting a stream of exhaust gas to be cleaned in the exhaust gas after-treatment device and thereby achieving an especially good and thorough mixing of the exhaust gas with the added urea. The exhaust gas after-treatment device includes a housing with a pipe opening into a mixing chamber and penetrating into the housing. The mixing chamber is pot-shaped and inverted over the mouth of the exhaust pipe so that the direction of flow of the incoming exhaust gas is reversed and the exhaust is deflected back radially outside of the exhaust pipe. An open end of the pot-shaped mixing chamber opens into a collecting space preferably designed to be airtight and can therefore supply the exhaust without loss to a downstream SCR catalytic converter. The advantage of the inventive exhaust gas after-treatment device is the flow reversal of the exhaust gas stream comprising a total of 360° and thus the especially good and thorough mixing of the exhaust gas to be cleaned with the urea and/or ammonia added to the exhaust gas after-treatment device at the beginning. The especially good and thorough mixing in turn results in a virtually complete reduction of the nitrogen oxides.

The exhaust pipe expediently has a perforated wall in the area of its mouth. Such perforated walls produce greater turbulence, which yields improved mixing of urea and/or the reducing agent with the exhaust gas to be cleaned in comparison with an unperforated exhaust pipe.

In an exemplary embodiment of the inventive approach, at least one of the following flow guidance elements is situated between the mixing chamber and the collecting space: perforated plate, spin element, spiral element. The elements listed here all produce a deflection of the exhaust gas stream and thus an additional mixing of the exhaust gas. It is self-evident that the aforementioned elements may be used either individually or in any combination with one another in the inventive exhaust gas after-treatment device.

In another exemplary embodiment of the inventive approach, a sound-absorbing space is situated downstream from the SCR catalytic converter. After the catalytic reaction in the SCR catalytic converter, i.e., after reduction of the nitrogen oxides, the exhaust gas stream is thus sent to the sound absorption chamber, where the sound is absorbed and thus the noise emission is reduced, e.g., through an appropriate lining of the chamber. The exhaust gas after-treatment device thus fulfills not only the purpose of cleaning the exhaust gas but also at the same time fulfills the function of a muffler so that an especially compact design can be achieved.

An $NO_x$ sensor is installed downstream from the SCR catalytic converter. Such an $NO_x$ sensor measures the $NO_x$ of the exhaust gas discharged from the SCR catalytic converter and sends this value to an analyzer device which compares the detected value with a stipulated setpoint value. In addition, it is conceivable that the addition of urea and thereby the reduction process can be regulated in accordance with a deviation between the measured actual value and the stipulated setpoint value.

It is self-evident that the features mentioned above and those yet to be explained below may be used not only in the particular combination given but also in other combinations or alone without going beyond the scope of the present invention.

Exemplary embodiments of the invention are depicted in the drawings and described in greater detail in the following description, where the same reference numerals are used to refer to the same or similar or functionally identical components.

BRIEF DESCRIPTION OF THE DRAWINGS

In schematic diagrams.

DETAILED DESCRIPTION OF THE INVENTION

Figure 1:
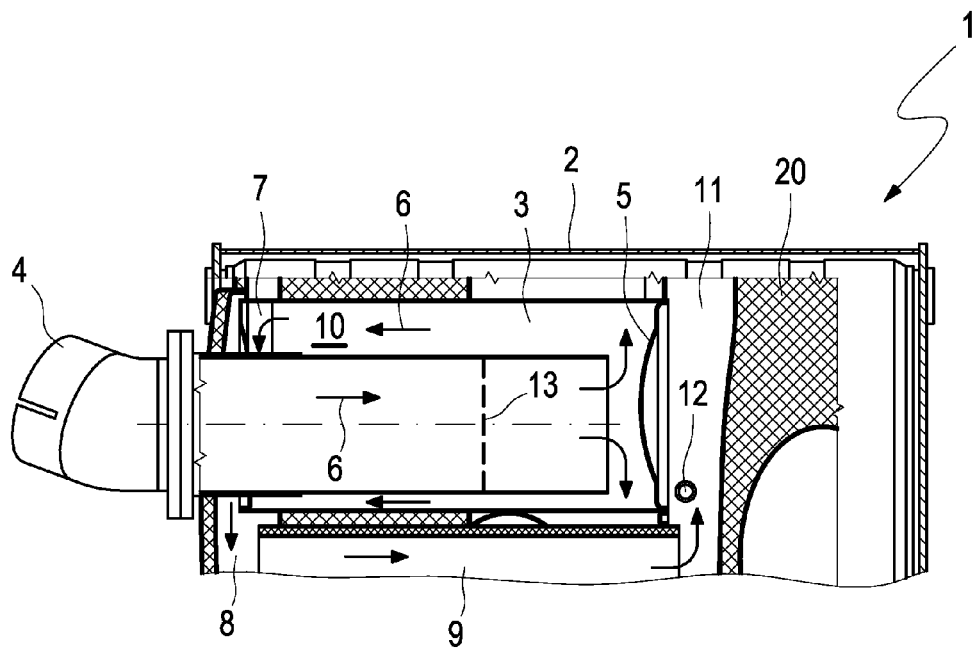
FIG. 1 shows a longitudinal section through an exhaust gas after-treatment device in the area of an exhaust pipe.

According to FIG. 1, an exhaust gas after-treatment device 1 for an internal combustion engine (not shown) has a housing 2 into which penetrates an exhaust pipe 4 that opens into a mixing chamber 3. The mixing chamber 3 is designed in the form of a pot and has a curved baffle plate 5 in all embodiments. This baffle plate 5 may have a sintered metal plate, for example or may be designed as such. The mixing chamber 3 serves to thoroughly mix the exhaust gas which is flowing into the exhaust gas after-treatment device 1 and to which a reducing agent such as urea has previously been added. For successful removal of the nitrogen oxides present in the exhaust gas, the exhaust gas must preferably be mixed homogeneously with the reducing agent, e.g., the urea. As shown in FIG. 1, the exhaust gas flows from left to right through the exhaust pipe 4 into the mixing chamber 3 along the flow arrows 6. The pot-shaped design of the mixing chamber 3 causes the inflowing exhaust to undergo a reversal in direction of flow and then flow back radially outside of the exhaust pipe 4, i.e., from right the left. Having arrived in an area at the left, i.e., an open end 7 of the pot-shaped mixing chamber 3, the exhaust flows into a collecting space 8 which sends the exhaust gas to a downstream SCR catalytic converter 9. The collecting space 8 is designed to be airtight so that the exhaust gas that has flowed from the mixing chamber 3 into the collecting space 8 can be sent to the SCR catalytic converter 9, preferably with no loss.

Radially outside of the exhaust pipe 4, a so-called return flow annular space 10 is formed according to FIGS. 1 through 6; in this return flow annular space the exhaust gas flows toward the open end 7 of the mixing chamber 3 after undergoing a 180° reversal in the direction of flow 6. All the diagrams in FIGS. 1 through 6 have in common the fact that the SCR catalytic converter 9 responsible for the reduction of the nitrogen oxides is shown only partially.

Downstream from the SCR catalytic converter 9 preferably a second collecting space 11 is arranged in which the exhaust gas is collected and sent from there to a sound absorption chamber 20 in which there is, for example, an acoustic filter and/or a particulate filter. Likewise downstream from the SCR catalytic converter 9, an $NO_x$ sensor 12 is provided to measure the nitrogen oxide content present in the cleaned exhaust gas stream and relaying this information to an analyzer and control unit (not shown). The analyzer and control unit then compares the measured $NO_x$ actual value with a predetermined $NO_x$ setpoint value and, if necessary, readjusts the amount of urea added. If the $NO_x$ limit is exceeded, it is also conceivable for other measures to be initiated, e.g., for a control light to light up or for the torque to be reduced.

In general, the exhaust gas after-treatment device 1 should be installed as close to the engine as possible. Likewise, a plurality of SCR catalytic converters 9 may be arranged in parallel with one another, preferably all being supplied with exhaust gas from a common collecting space 8. These additional SCR catalytic converters 9, which are shown only in FIGS. 8 and 9, could be arranged in parallel beneath the SCR catalytic converter 9 shown there, e.g., in FIGS. 1 through 6.

In a modification of FIG. 1, the exhaust pipe 4 may protrude with its mouth much less into the mixing chamber 3 and, for example, to end already in the area of a broken line 13 shown in the figure.

Various forms of mouth areas of the exhaust pipes 4 in FIGS. 2 through 6 are explained in greater detail below.

Figure 2:
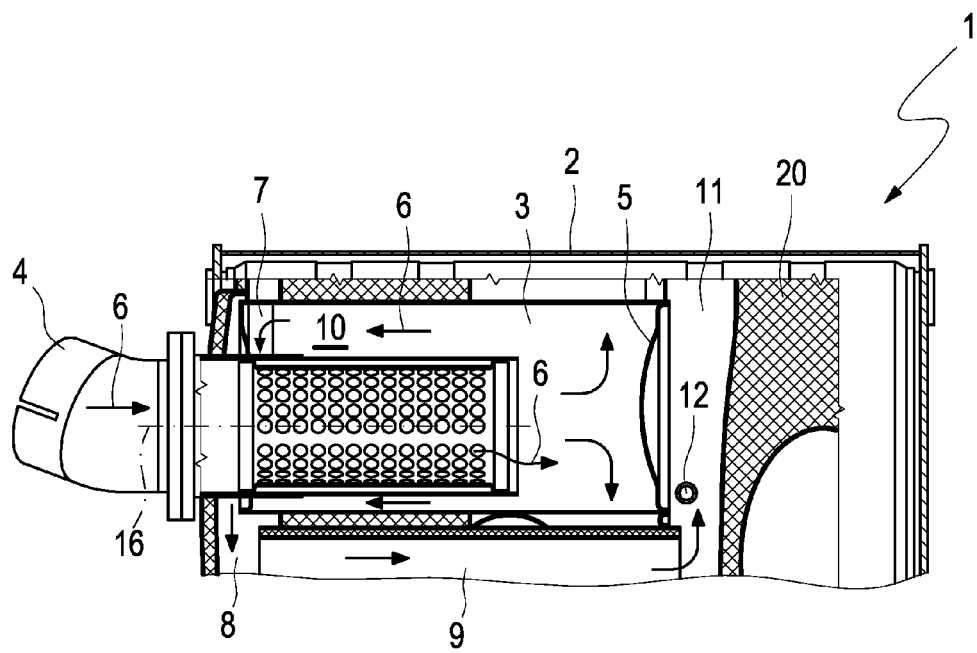
FIG. 2 shows a diagram like that in FIG. 1 but with a different exhaust pipe.

FIG. 2 shows an exhaust pipe 4, the wall of which is designed to taper radially inward in the area of the mixing chamber 3 and which is perforated in the area of the taper. Therefore exhaust flows radially outward through the perforations and then enters the mixing chamber 3 according to the flow arrows 6. The perforations also serve to support the mixing process between the exhaust gas and the reducing agent.

Figure 3:
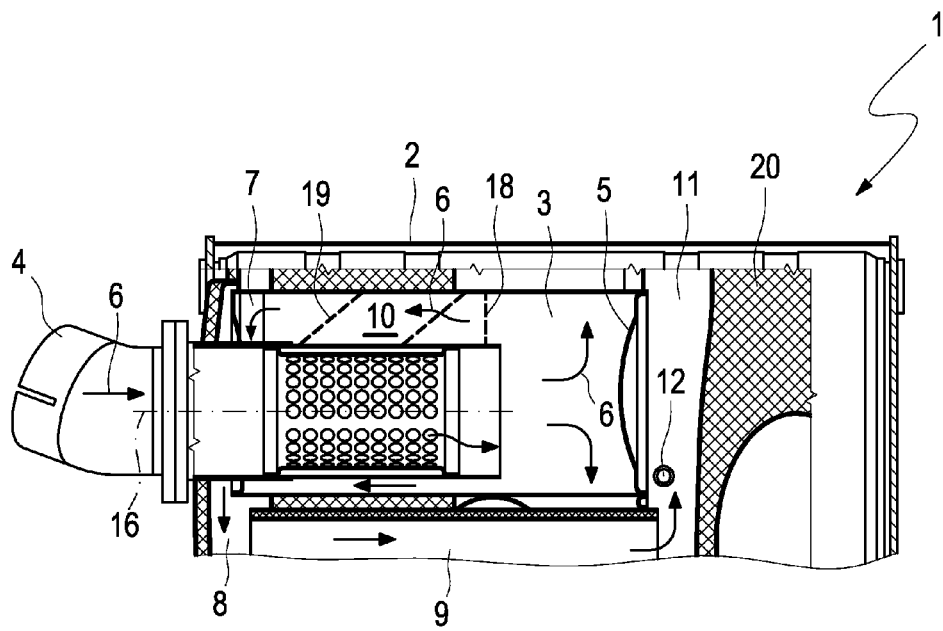
FIG. 3 shows a diagram like that in FIG. 2 but with a different exhaust pipe.

FIG. 3 shows an exhaust pipe 4 that also tapers in the area of the mixing chamber 3 and is perforated in the tapered area, whereby in comparison with FIG. 2, a definitely smaller perforated longitudinal extent is selected. The flow characteristic here is analogous to that in FIG. 2, in that the exhaust gas leaves the exhaust pipe 4 through its opening arranged at the axial end. To additionally promote the mixing effect between the reducing agent and the exhaust gas, flow guidance elements 18 such as a perforated plate, a spin element or a spiral element, may be arranged in the return flow annular space 10 or in the mixing chamber 3. It is also conceivable for the pot-shaped mixing chamber 3 to have a spiral device in the manner of a perforated screw channel 19 along the return flow annular space 10.

Figure 4:
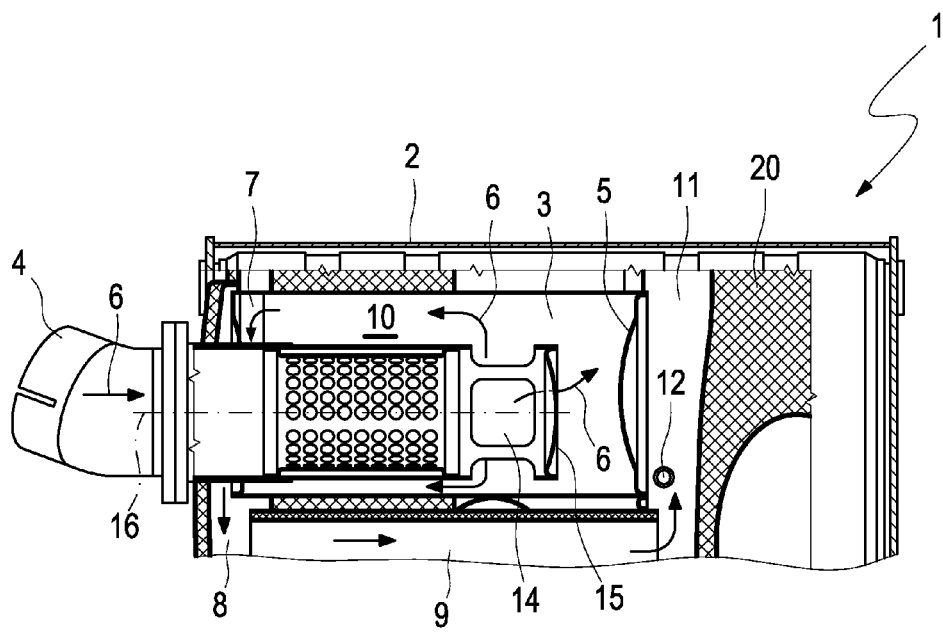
FIG. 4 shows a diagram like that in FIG. 3 but with an exhaust pipe closed at one end.

FIG. 4 shows an exhaust pipe 4 which has a perforated area in the mixing chamber 3 similar to that of the exhaust pipe in FIG. 3, but the exhaust gas here does not leaves the exhaust pipe 4 in the axial direction at the end but instead leaves it through openings 14 provided in the mouth area and/or in the wall of the exhaust pipe 4.

Figure 5:
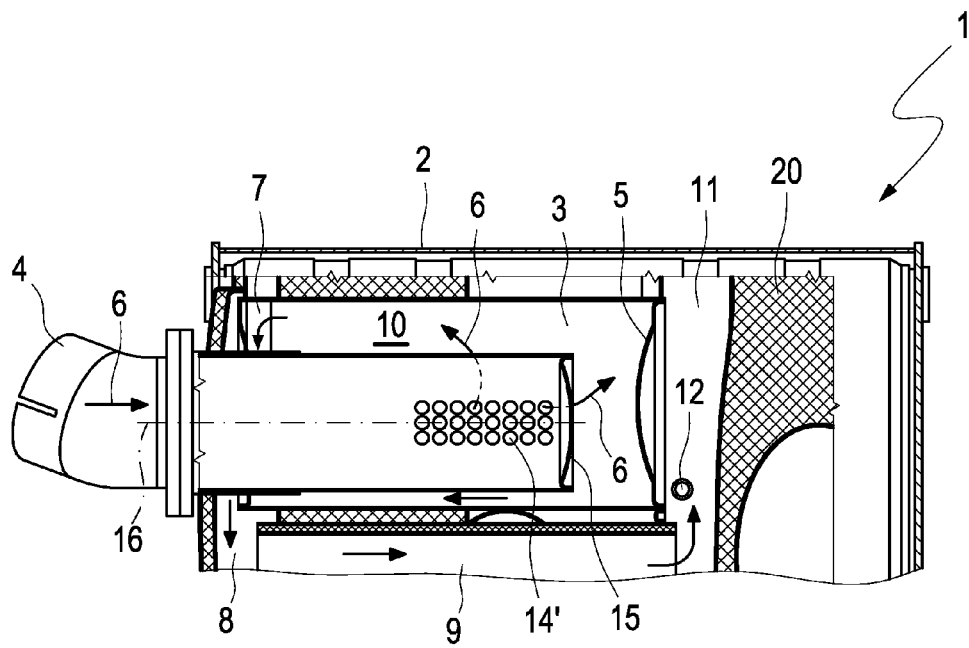
FIG. 5 shows a diagram like that in FIG. 4 but with the wall of the exhaust pipe perforated in the area of a mouth.

FIG. 5 shows an end area of the exhaust pipe 4 which is closed at the axial end by a plate 15 and has openings 14' passing through the wall of the exhaust pipe 4 in the radial direction close to the axial end of the exhaust pipe 4 in the mixing chamber 3.

Figure 6:
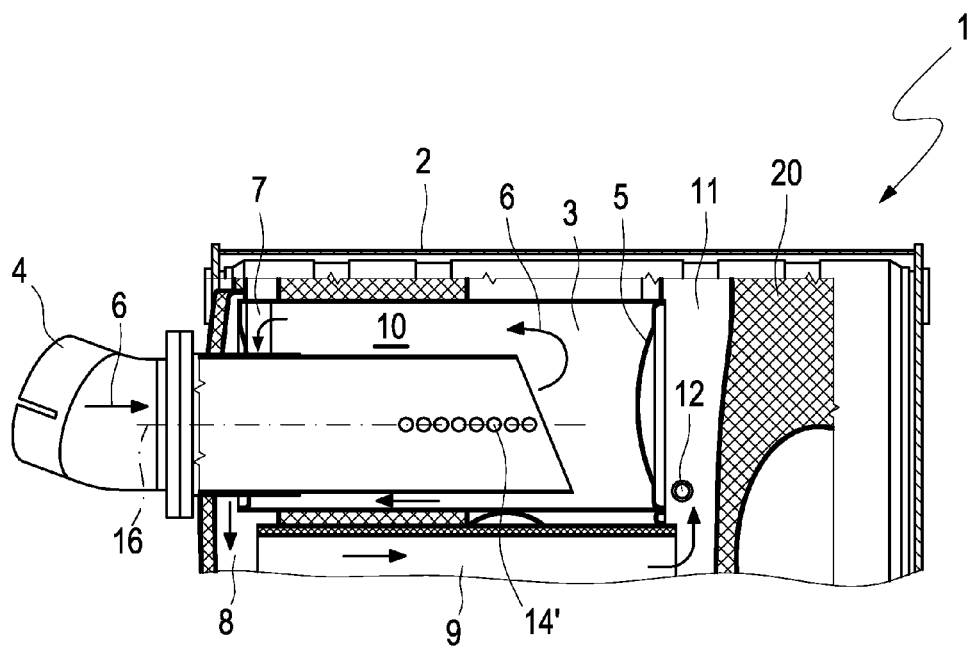
FIG. 6 shows a diagram like that in FIG. 5 but with an exhaust pipe open at one end.

In FIG. 6, the end area of the exhaust pipe 4 has an axial passage and openings 14" provided in the wall of the exhaust pipe 4. In this way, the exhaust gas can leave the exhaust pipe 4 in both axial and radial directions, so that an especially good mixing effect can be achieved in the mixing chamber 3. The openings 14" are situated here on an axis 16 of the exhaust pipe 4 according to FIG. 6, whereby it is also conceivable for the openings 14" to be arranged in another way in the wall of the exhaust pipe 4. Due to the fact that the exhaust pipe 4 ends at an angle on the mixing chamber end, the mixing process in the mixing chamber 3 is additionally supported by this fact.

Figure 7:
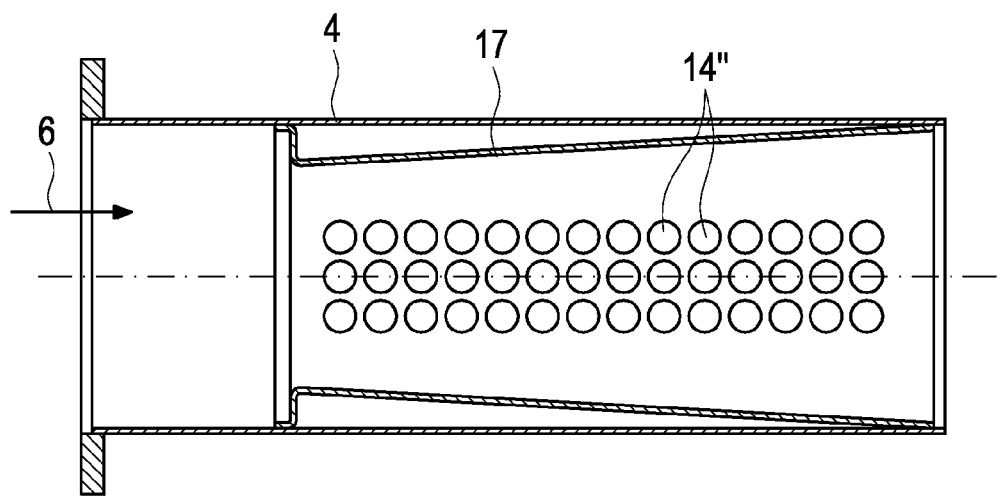
FIG. 7 shows a longitudinal section through an exhaust pipe with a venturi nozzle.

Additionally or alternatively to the end areas of the exhaust pipe 4 shown in FIGS. 1 through 6, the exhaust pipe 4 may be adapted as a venturi nozzle, as shown in FIG. 7, or it may have an insert 17 designed as a venturi nozzle. In such a venturi nozzle, a vacuum and an increase in velocity of flow are achieved at the narrowest point in the exhaust pipe 4 without any additional active influence. After passing by the narrowest point, openings 14" are also provided on the insert 17 according to FIG. 7, additionally promoting thorough mixing of the reducing agent with the exhaust gas stream.

Figure 8:
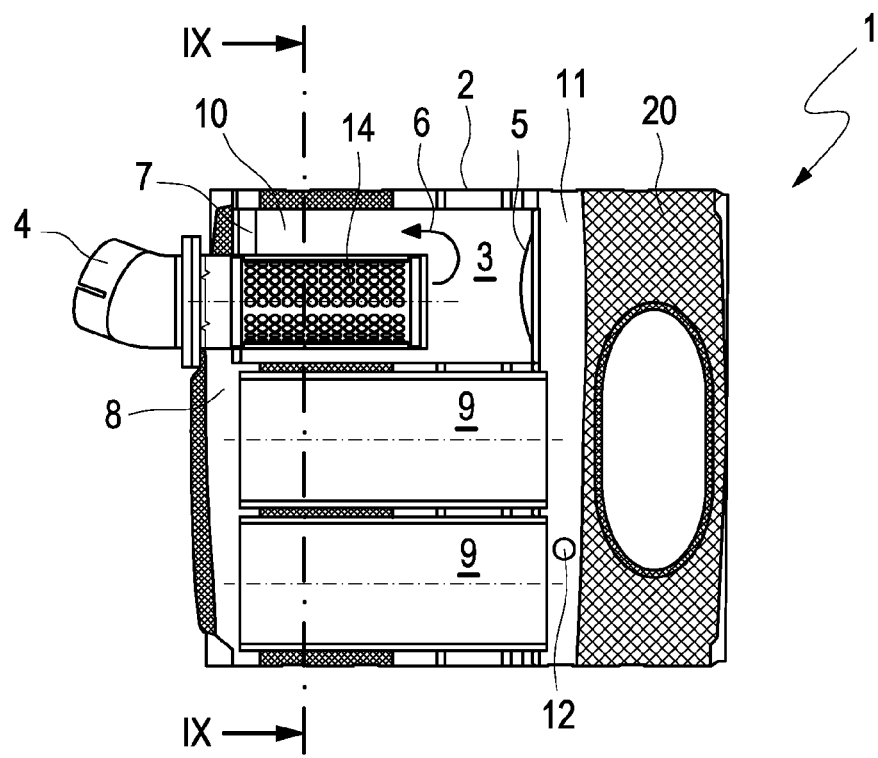
FIG. 8 shows a longitudinal section through the exhaust gas after-treatment device like that in FIG. 2 but with a plurality of SCR catalytic converters.
Figure 9:
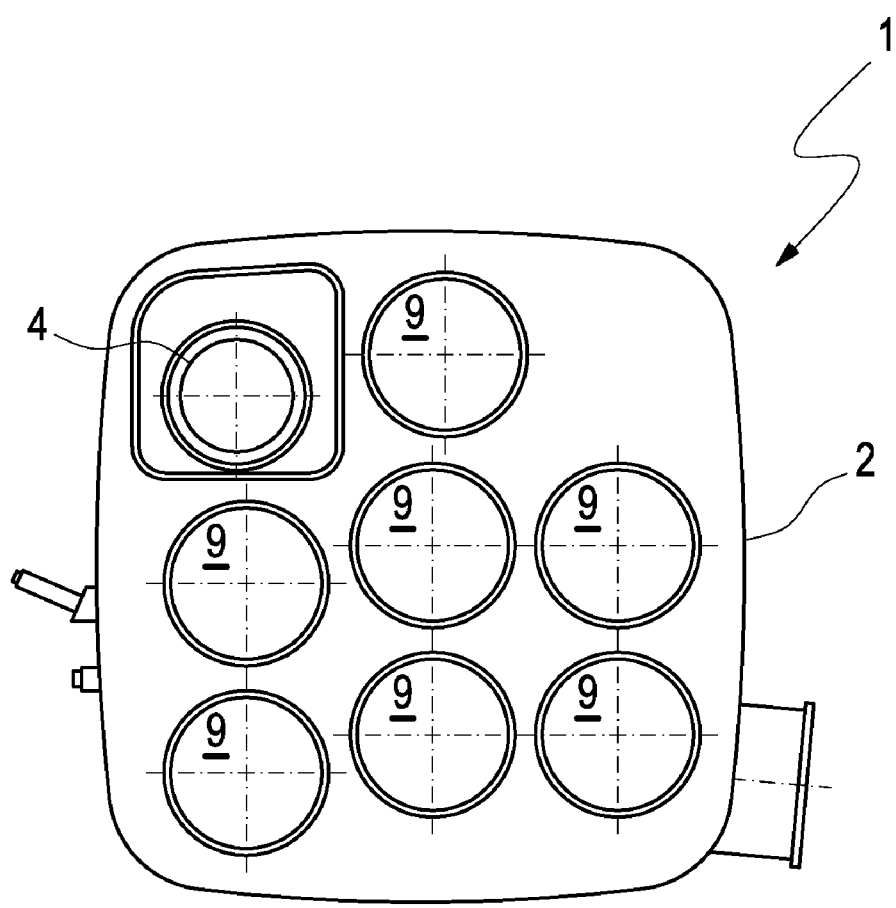
FIG. 9 shows a cross section through the exhaust gas after-treatment device along line IX-IX.

FIG. 8 shows a reduced longitudinal section of the inventive exhaust gas after-treatment device 1, whereby two SCR catalytic converters 9 are arranged beneath the mixing chamber 3, each communicating at one end with the collecting space 8 and at the other end with the second collecting space 11. The exhaust gas after-treatment device 1 may be adapted so that a plurality of SCR catalytic converters, e.g., seven, are arranged in parallel and one above the other and/or side by side, as shown in FIG. 9. The $NO_x$ content is measured downstream from the SCR catalytic converters 9, e.g., shortly before a sound absorption chamber 20. As mentioned above the SCR catalytic converters 9 are all connected to the collecting space 8 so they communicate with it at the flow input end, but at the flow output end, each is connected to the sound absorption chamber 20 so it communicates with it via the second collecting space 11. Of course others, in particular a larger number of SCR catalytic converters 9, are also conceivable.

The invention claimed is:

1. An exhaust gas after-treatment device for an internal combustion engine, said after-treatment device comprising:
    a housing defining a mixing chamber;
    an exhaust pipe penetrating into said housing, said exhaust pipe having an end free-standing within and opening into said mixing chamber, and
    an unoccupied channel arranged radially outside said exhaust pipe defined by an inner wall of said mixing chamber and an exterior of said exhaust pipe, said channel having a length extending from said free-standing end of said exhaust pipe to a collecting space, wherein said mixing chamber reverses a direction of flow from the incoming exhaust gas and returns it along said length of said channel into said collecting space configured to reverse the flow direction of the exhaust gas a second time and supply the exhaust gas directly to at least one downstream selective catalytic reduction (SCR) catalytic converter.

2. The exhaust gas after-treatment device according to claim 1, wherein the exhaust pipe comprises a venturi nozzle or has an insert comprising a venturi nozzle.

3. The exhaust gas after-treatment device according to claim 1, further comprising a flow guidance element selected from the group consisting of a perforated plate, spin element, and spiral element, wherein said flow guidance element is positioned within said channel between said mixing chamber and said collecting space.

4. The exhaust gas after-treatment device according to claim 1, wherein said mixing chamber comprises a spiral device in the manner of a perforated screw channel.

5. The exhaust gas after-treatment device according to claim 1, wherein the exhaust gas after-treatment device is arranged near the engine.

6. The exhaust gas after-treatment device according to claim 1, further comprising an $NO_x$ sensor positioned downstream from the SCR catalytic converter.

7. The exhaust gas after-treatment device of claim 1, wherein the exhaust pipe is free-standing within the mixing chamber over a length substantially equal to the length of said channel.

8. The exhaust gas after-treatment device of claim 1, wherein said SCR catalytic converter is configured to receive exhaust gas traveling in a direction opposite that of the direction of exhaust gas flow though said channel.

9. The exhaust gas after-treatment device of claim 1, wherein said SCR catalytic converter is arranged adjacent to at least a portion of said collecting space.

10. The exhaust gas after-treatment device of claim 1, wherein said SCR catalytic converter is arranged outside, the channel in an axial direction.

11. The exhaust gas after-treatment device according to claim 1, further comprising a baffle plate positioned in said mixing chamber opposite a mouth of the exhaust pipe.

12. The exhaust gas after-treatment device according to claim 11, wherein said baffle plate comprises a sintered metal plate.

13. The exhaust gas after-treatment device according to claim 1, wherein said exhaust pipe has a perforated wall in the area of its mouth, and the exhaust gas flow radially outward though said perforated wall into said mixing chamber.

14. The exhaust gas after-treatment device according to claim 13, wherein the exhaust pipe comprises a reduced cross-section in the area having the perforated wall compared to the cross-section of the exhaust pipe upstream or downstream of the area having the perforated wall.

15. The exhaust gas after-treatment device according to claim 1, further comprising a sound absorption chamber arranged downstream from the SCR catalytic converter.

16. The exhaust gas after-treatment device according to claim 15, further comprising an acoustic filter and a particulate filter, said acoustic filter and said particulate filter arranged in said sound absorption chamber.

17. An exhaust gas after-treatment device for an internal combustion engine, said after-treatment device comprising:

a housing defining a mixing chamber;

an exhaust pipe having a length thereof penetrating into said housing and having an end free-standing within and opening into said mixing chamber, wherein the exterior of the exhaust pipe and said mixing chamber define an unoccupied channel arranged radially outside of said exhaust pipe, the channel having a length substantially equal to the length of the exhaust pipe penetrating into said housing, said channel in direct communication with a collecting space along a length thereof, wherein said collecting space is arranged at an end of said channel opposite said mixing chamber, wherein said mixing chamber reverses a direction of flow from the incoming exhaust gas and returns it radially outside the exhaust pipe into said collecting space via said channel, said collecting space configured to supply the exhaust gas to at least one downstream selective catalytic reduction (SCR) catalytic converter arranged adjacent at least a portion of said collecting space.

18. The exhaust gas after-treatment device according to claim 17, wherein the exhaust gas flow undergoes a second reversal of direction after flow returns radially outside the exhaust pipe and before the exhaust gas is supplied to the at least one SCR.

19. An exhaust gas after-treatment device for an internal combustion engine, said after-treatment device comprising:

a housing defining a mixing chamber;

an exhaust pipe penetrating into said housing having an end free-standing within and opening into said mixing chamber, wherein the exterior of the exhaust pipe and the mixing chamber define an unoccupied annular space arranged radially outside of the exhaust pipe, wherein said mixing chamber reverses a direction of flow from the incoming exhaust gas and returns the flow into a collecting space directly through said annular space, said collecting space configured to reverse the flow direction of the exhaust gas a second time and supply the exhaust gas directly to at least one downstream selective catalytic reduction (SCR) catalytic converter.

20. An exhaust gas after-treatment device for an internal combustion engine, said after-treatment device comprising:

a housing defining a mixing chamber;

an exhaust pipe penetrating into said housing, said exhaust pipe having an end free-standing within and opening into said mixing chamber; and a channel arranged radially outside said exhaust pipe defined by an inner wall of said mixing chamber and an exterior of said exhaust pipe, said channel having a length extending from said free-standing end of said exhaust pipe to a collecting space, wherein said mixing chamber reverses a direction of flow from the incoming exhaust gas and returns it along said length of said channel into said collecting space configured to reverse the flow direction of the exhaust gas a second time and supply the exhaust gas to at least one downstream selective catalytic reduction (SCR) catalytic converter, and wherein said exhaust pipe has a perforated wall in the area of its mouth, and the exhaust gas flows radially outward though said perforated wall into said mixing chamber.

* * * * *